United States Patent [19]

Franceschini

[11] 3,915,826

[45] Oct. 28, 1975

[54] METHOD FOR THE ELECTRO-OSMOTIC CONVERSION OF THE SCALY STRUCTURE OF A MOIST CLAY MASS INTO A GRANULAR STRUCTURE

[75] Inventor: Alfonso Franceschini, Piacenza, Italy

[73] Assignee: Provalor Anstalt, Vaduz, Liechtenstein

[22] Filed: Nov. 12, 1973

[21] Appl. No.: 415,289

[30] Foreign Application Priority Data
Nov. 15, 1972 Italy ................................ 31684/72

[52] U.S. Cl. ............................. 204/180 R; 204/149
[51] Int. Cl.² ......................................... B01D 13/02
[58] Field of Search ......... 204/299, 180 R, 130, 131

[56] References Cited
UNITED STATES PATENTS

| | | | |
|---|---|---|---|
| 1,715,970 | 6/1929 | Williams | 204/180 R |
| 2,831,804 | 4/1958 | Collopy | 204/180 R X |
| 3,417,823 | 12/1968 | Faris | 204/180 R X |

Primary Examiner—John H. Mack
Assistant Examiner—A. C. Prescott
Attorney, Agent, or Firm—Ladas, Parry, Von Gehr, Goldsmith & Deschamps

[57] ABSTRACT

A method for the electro-osmotic conversion of the scaly structure of a moist clay mass into a granular structure which practically does not contain any sucked-up water, wherein at least one shaft is bored into the clay mass having such scaly structure, about which shaft there are imbedded into the clay mass a number of elongate electrodes composed on an electrically-conductive metal selected from the group comprising aluminum, copper, iron and alloys thereof, in such a manner that at least those electrodes most remote from the shaft are connected with a source of positive electrical direct-current whereas at least an electrode located in the shaft is connected with a source of negative electrical direct-current. The voltage between the aforementioned current sources, namely the positive and negative sources, amounts to between about 50 volts and about 1,000 volts and the supply of the electrodes with the electrical current is continued while water collecting in the shaft is removed until the clay mass assumes a granular structure and practically no longer possesses any sucked-up water.

6 Claims, 3 Drawing Figures

METHOD FOR THE ELECTRO-OSMOTIC CONVERSION OF THE SCALY STRUCTURE OF A MOIST CLAY MASS INTO A GRANULAR STRUCTURE

BACKGROUND OF THE INVENTION

The present invention relates to a new and improved method for the electro-osmotic conversion of the scaly or leafy structure of a moist clay mass into a granular structure, practically devoid of any sucked-up water.

As is known, clay possesses a scaly or leafy structure in which the molecules are layered into piles or packs held together by van der Waals' forces. Likewise known is the fact that clay contains alkali ions or alkaline earth ions which emanate from the decomposition of the original rocky mineral substance or rocks. In particular, the clain contains, apart from other cations, the following cations: $Ca^{++}$, $Na^+$, $K^+$, $Mg^{++}$, $H^+$ and $NH_1^+$. These cations can be exchanged for other cations and have the property of being capable of being extensively hydrated owing to their electrical charge. The occurrence of the thus-mentioned properties brings about that the rain- or underground or spring water penetrates into the clay molecule piles and, when the effective radius of the aforementioned ion charges has been reached, the water is electrostatically retained and deposits in layers between the clay molecule piles. Consequently, there results the phenomenon that with the presence of the water the clay mass initially swells, lowering its mechanical strength, then subsequently dissolves, with the result that its strength is practically eliminated. Owing to this phenomenon the clay masses are subjected to land or earch slides, oftentimes of very great extent, and additionally they are not suitable for carrying the weight of the foundation of buildings, bridges and in any event massive structures without sinking.

The damage brought about by landslides and especially from such properties of the clay are extensive and up to the present there has not been found any means to counteract thereagainst. To improve the strength or stability of the clay masses there is employed at the present time in most cases cage fortifications, pilings, injection molded concrete structures and the like, without really obtaining anything more than an inhibition of the damage to objects and persons, and without really solving the repeatedly present problem which time and again incurs new costs.

A number of experiments have been carried out in order to strive to remove the water sucked-up by the ground. It has been observed that upon inserting two electrodes into the ground, of which the one is connected with a source of positive electrical direct-current and the other with a source of negative electrical direct-current, the water migrates electrokinetically to the negative electrode, collecting at that location and in consequence thereof can be removed from the ground. However, these experiments were not further pursued since it was found that the favorable effects of the removal of the water from the clay mass was dependent upon the persistence of good weather conditions and upon the requisite distance from the influence of the underground water; in other words, a mass of clay which has been strengthened in this manner would again swell up and dissolve with the first rainfall.

SUMMARY OF THE INVENTION

In order to realize the method aspects of the present invention, there was started from the determination that the absence of mechanical strength and the geodetic instability of the clay masses are dependent upon the presence of water which imbues and penetrates therethrough; likewise there was started from the determination that the water does not seep through the clay mass (when the clay mass has been fully imbued with water it in fact becomes water impervious), because the water is held back by the alkali cations and alkaline earth cations which impart to the clay the leafy or scaly structure.

Hence, it is a primary object of the present invention to provide a new and improved method rendering it possible to change the molecular structure of the clay from a scaly structure into a granular structure, and specifically by exchanging the cations of the alkali and alkaline earth metals present in the clay for other cations which are less, or in fact not at all, capable of being hydrated, so that this clay which possesses a granular structure becomes impervious to water.

A further object of the invention aims at the provision of a method of the previously disclosed character, by means of which, simultaneous with the conversion of the clay structure, there is realized the almost complete removal of the sucked-up water contained in the clay.

A further object of this invention relates to a new and improved method of the character described by means of which an unstable clay mass having less strength can be irreversibly converted into a homogeneous mass possessing the strength of a sandstone block with high mechanical strength.

Finally, a further significant object of this invention relates to a new and improved method for the electro-osmotic conversion of the scaly or leafy structure of a moist clay mass into a granular structure, which method can be carried out with relatively simple equipment and can be easily employed for any type of ground encountered.

Now in order to implement these and still further objects of the invention, which will become more readily apparent as the description proceeds, the invention contemplates boring or drilling at least one shaft into a clay mass possessing a leafy or scaly structure, a number of elongate electrodes are imbedded or inserted about the shaft and throughout the entire surface of the clay mass, such electrodes consisting of an electrically-conductive metal of the group comprising aluminum, copper, iron and alloys thereof, and that at least the electrodes which are furthest removed from the shaft are connected with a source of positive electrical direct-current, whereas at least one of the electrodes associated with the shaft is connected with a source of negative electrical cirect-current. The voltage between the aforementioned sources, the positive and the negative sources, amounts to between about 50 volts and 1,000 volts, and wherein the supply of the electrodes with the electrical current is continued during such time as the water which has collected in the shaft is removed, until the clay mass exhibits a granular structure and practically no longer contains any sucked-up water.

In order to understand the present invention better, there will be discussed the method aspects in detail in conjunction with an exemplary embodiment of the use of the method, which is given purely by way of explanation and not by way of limitation in any manner, and while referring to the accompanying drawings.

BRIEF DESCRIPTION OF THE DRAWINGS

In particular, further aspects of the invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
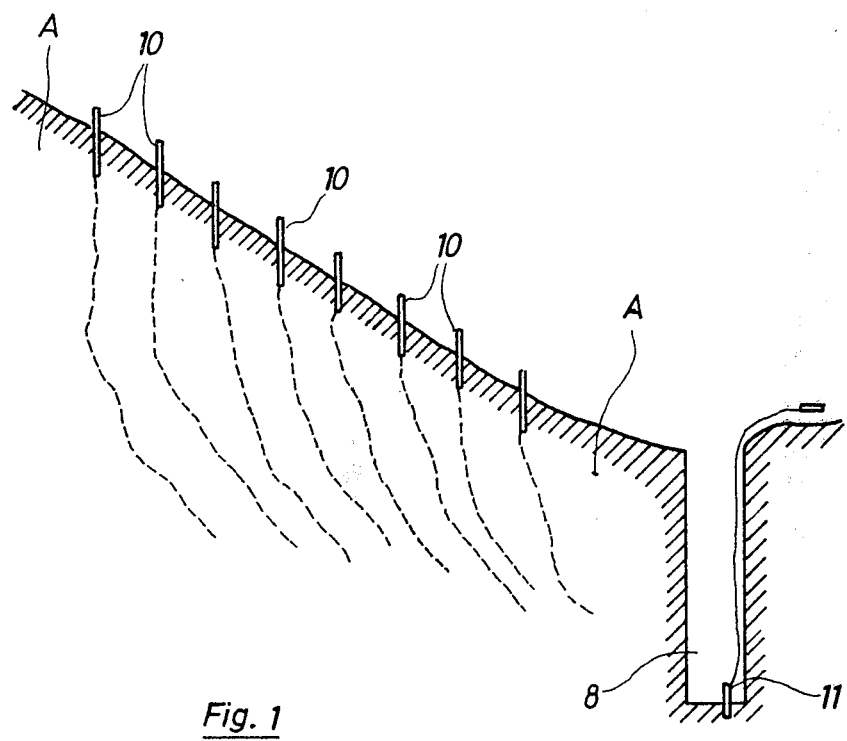
FIG. 1 is a schematic vertical cross-sectional view of a slope or sloped terrain showing a shaft and electrodes placed around the shaft at the slope and an electrode in the shaft.

Referring now to the drawings, it is assumed that ground or earth consisting of a sliding clay mass A and which for instance forms the slope of a hill should be strengthened. A part of this ground is shown in vertical cross-sectional view in FIG. 1, whereas in FIG. 2 there is shown in plan view the total surface of the ground which participates in the landslide.

Figure 3:
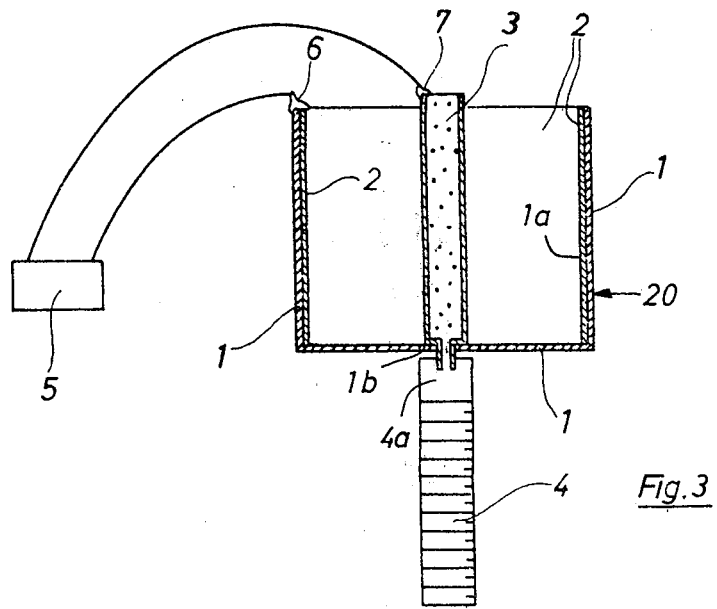
FIG. 3 illustrates in cross-sectional view a device which is used in order to determine the value of the electrical voltage employed for carrying out the method aspects of the invention at the ground in question.

In order to properly carry out the method aspects of this development there are particularly employed a number of containers 20, such as for instance shown in FIG. 3. Each of these containers 20 embodies an outer shell or casing 1 formed of plastic, the side walls 1a of which are coated or covered with a foil 2 formed of aluminum, copper, iron or an alloy of two or more of these metals.

At the center of the container 20 there is located a perforated cylindrical portion 3 formed of the same metal as the foil 2, and which piercingly extends through a bore 1b in the floor of the container 1 and merges with the opening 4a of a graduated measuring glass 4.

Initially there are taken a number of samples of the ground which is to be strengthened and such placed into the above-described container 20, so that there is filled the space between the foil 2 and the perforated cylindrical portion 3. Thereafter, the positive pole of an electrical current source 5 is connected by an electrical lead or wire, the end of which is provided with a connection terminal 6, with the foil 2 and the negative pole of such current source is connected by the connection terminal 7 with the perforated cylindrical portion 3.

Now the different containers filled with the earth samples are supplied with direct-current of different voltages and after a certain time there is determined at which container there has occurred the greatest running-off of the sucked-up water into the graduated measuring glass 4 (this phenomenon is predicated upon an electro-physical process) and in which container the earth has attained the greatest irreversible strength (electro-chemical process), which can be checked by laboratory tests, in that the ground is subjected to pressure and cutting tests.

In this way there is determined by trial the ideal value of the voltage which for the ground to be examined provides the best results with respect to the irreversible strength and the revmoval of water. In this regard there should be observed that the aforementioned voltage can vary from case to case between about 50 volts and about 1,000 volts and that it normally is in the order of between about 50 volts and about 100 volts.

Now there are bored at the easily sliding ground (FIGS. 1 and 2) for instance two shafts which are spaced from one another anywhere from about 30 meters to 100 meters (at which in FIG. 1 only one such shaft has been depicted), and which have been designated by reference characters 8 and 9, these shafts being bored down to the bottom or base of the landslide.

Thereafter, there are inserted into the ground, around the shafts 8 and 9 and over the entire surface of the ground to be treated, a very large number of electrodes 10 consisting of aluminum, copper, iron or their alloys and in a length of, for instance, about 1–10 meters, normally in a length of about 2 to 3 meters. In certain cases there may be simultaneously required as many as 10,000 electrodes. These electrodes, which have been designated by reference numeral 10, are conveniently illustrated in FIG. 2 by small circles, whereas further from FIG. 1 there will be apparent that an electrode 11 has been inserted into the ground at the base of the therein depicted shaft 8.

Figure 2:
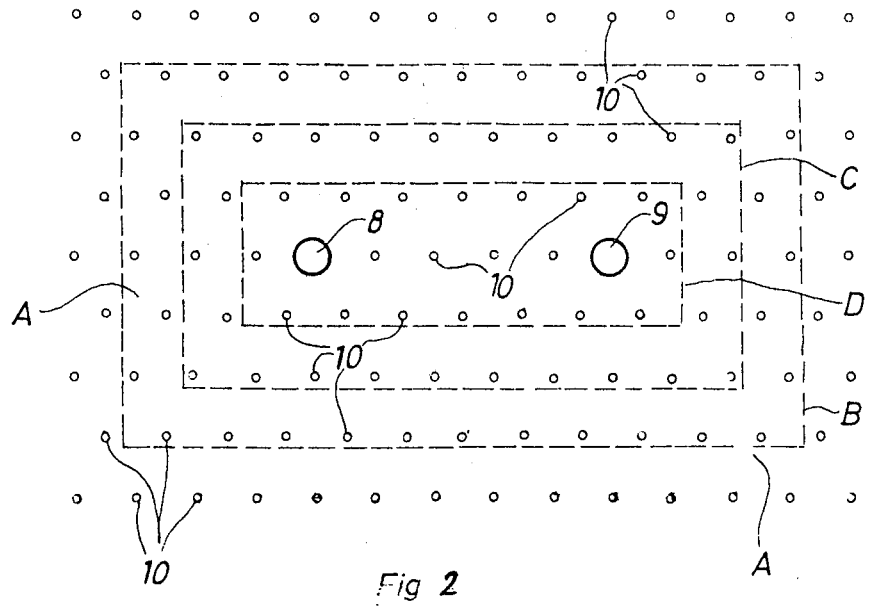
FIG. 2 is a schematic plan view of the arrangement of FIG. 1.

Thereafter, the electrodes which are located at the edge of the surface of the ground to be treated, are coupled with a direct-current source, for instance the electrodes located externally of an imaginary line, which has been illustrated in FIG. 2 by a broken line and designated with the reference character B. All of the other electrodes, that is to say, those within the line B and the electrode 11, on the other hand are connected with the negative pole of the same direct-current source. The voltage applied to the electrodes 10 and 11 possesses a value which corresponds to that previously determined by trial through the use of the aforedescribed containers. The current intensity can vary between about 10 amperes and about 300 amperes, generally amounts to about 30 amperes; in particular, then when it is required to bring about a rapid strengthening of the ground, there is selected a high value of current intensity; on the other hand the lower values of the current intensity are then employed when it is necessary to proceed with care in order to avoid possible damage to persons and objects.

During the time that the electrodes 10 and 11 are supplied in the aforementioned manner with current, there occurs a migration of the sucked-up water in the clay mass from the outside towards the inside at the broken line B and because the water entrains the non-metallic cations there simultaneously occurs the removal of the alkali cations and the alkaline earth cations which are originally present in the clay and their exchange with the metallic ions in the metal from which there are formed the electrodes. Therefore these electrodes wear rapidly, so that they must be replaced by new ones.

Finally, in the ground the metal ions, for instance aluminum ions, migrate from the electrodes connected with the positive pole of the electrical voltage source, and specifically along the broken line depicted in FIG. 1, whereby such ions replace the alkali cations and the alkaline earth cations which are entrained by the water and form non-soluble salts, for instance aluminum salts, exactly in the manner as such occurs during binding or bonding of concrete. As soon as the ground which is located externally of the broken line B has irreversibly strengthened and has practically lost the entire originally sucked-up water, there are connected with the positive pole of the direct-current source also the electrodes located between the broke line B and the broken line C and there is then proceeded in the same manner as already described.

Thereafter there are connected with the positive pole also the electrodes located between the broken lines C and D, and then all other electrodes located within the lines D, and successively the electrodes which are always closer arranged to the shafts 8 and 9. In the last phase of the process there only remains connected with the negative pole of the direct-current source the electrodes which are located at the base of the shafts. It is important to observe that during the performance of the method water is continuously removed from the shaft, although a small amount of water is permitted to remain in each shaft.

On the basis of experiments which have been carried out in large numbers, it could be determined that a clay-containing earth treated with the electro-osmotic method of this development completely looses the geotechnical properties characteristics of such earth or ground (for instance the leafy or scaly structure) and that it has imparted thereto the strength and the load-bearing properties of ground suitable for a foundation and possessing granular, sand-like markedly cemented and completely water impervious structure. A clay-containing ground or earth with an average cutting strength of about 0.30 to 0.40 kg/cm$^2$ and a modulus of elasticity of about 0.70 to 0.80 kg/cm$^2$ has imparted thereto, after carrying out the strengthening method of the invention, for instance a cutting strength of about 3 kg/cm$^2$ and a modulus of elasticity of about 5 to 6 kg/cm$^2$. This ground can no longer slide and is quite suited for supporting building foundations and the like, since it is completely insensitive or non-responsive to the swelling- and dissolution effects of water.

A final comment concerns the following facts: since the anodes, during the performance of the electro-osmotic method, deliver their metallic ions into the ground, the anions should possess the electrode-chemical capability of displacing the ions present in the clay-containing ground, without however possessing their hydrophilic properties. It has been determined that for the practical application of the invention the anodes should only be fabricated from aluminum, copper, iron and their alloys, since these metals easily displace the alkali ions which are present in the clay and at the same time are capable of bringing about the phenomenon of the electro-structural conversion with the formation of insoluble and stable salts.

While there is shown and described present preferred embodiments of the invention, it is to be distinctly understood that the invention is not limited thereto, but may be otherwise variously embodied and practiced within the scope of the following claims.

Accordingly, what is claimed is:

1. A method for the electro-osmotic and electro-chemical conversion of a moist clay mass containing alkali cations and/or alkaline earth cations into a granular mass from which sucked-up water is substantially absent, comprising the steps of drilling at least one shaft into the clay mass to be converted, placing a first electrode within said one shaft, placing around said one shaft a plurality of second electrodes, each of said second electrodes being made of a metal selected from the group consisting of aluminum, copper, iron and alloys thereof, maintaining said first electrode in permanent connection with the negative pole of a current source, connecting at least the second electrode disposed furthest away from said shaft with the positive pole of said current source, and supplying a current to the electrodes sufficient to cause migration of the water in the clay mass towards said first electrode while simultaneously replacing said alkali cations and/or said alkaline earth cations with cations supplied by said second electrodes.

2. The method as defined in claim 1, wherein the voltage of said current source is in the order of between about 50 volts and about 1,000 volts.

3. The method as defined in claim 1 wherein initially only the second electrode disposed furthest away from said shaft is connected with the positive pole of said current source and the remaining second electrodes are subsequently connected with the positive pole of said current source in order of decreasing distance of said remaining second electrodes from said shaft.

4. The method as defined in claim 1 including the step of selecting the voltage of the current source to provide a current flowing between said poles of between about 10 amperes and about 300 amperes.

5. The method as defined in claim 1 further including the step of providing a second shaft in said clay mass to be converted, said second shaft being spaced from said one shaft and being provided with at least one electrode permanently connected to the negative pole of said current source.

6. The method as defined in claim 5 wherein the spacing of the two shafts from one another is in the order of 20 to 100 meters.

* * * * *